(12) United States Patent
Kihara et al.

(10) Patent No.: US 6,852,952 B1
(45) Date of Patent: Feb. 8, 2005

(54) WELDING METHOD OF AN SI-BASED MATERIAL

(75) Inventors: Toru Kihara, Osaka (JP); Kazuya Kuriyama, Osaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/556,536

(22) Filed: Apr. 24, 2000

(30) Foreign Application Priority Data

Apr. 23, 1999 (JP) .......................................... 11-115799

(51) Int. Cl.[7] .............................................. B23K 10/10
(52) U.S. Cl. ...................................................... 219/383
(58) Field of Search .................................. 219/383, 123, 219/124.01, 130.4, 75, 121.63, 137 R; 385/96; 65/402

(56) References Cited

U.S. PATENT DOCUMENTS

| | | | | |
|---|---|---|---|---|
| 2,445,063 A | * | 7/1948 | Guyer ........................ 219/383 |
| 2,590,173 A | * | 3/1952 | Guyer ........................ 219/183 |
| 2,972,695 A | * | 2/1961 | Wroe ......................... 219/123 |
| 4,049,414 A | * | 9/1977 | Smith ......................... 385/96 |
| 4,377,403 A | * | 3/1983 | McLandrich ................. 65/402 |
| 4,569,307 A | * | 2/1986 | Pinkhasov .................. 219/383 |
| 4,628,180 A | * | 12/1986 | Edberg ................... 219/124.01 |
| 5,487,125 A | * | 1/1996 | Kammlott et al. ............ 385/96 |
| 6,225,594 B1 | * | 5/2001 | Zehavi ................... 219/121.63 |
| 6,284,997 B1 | * | 9/2001 | Zehavi et al. ........... 219/137 R |

* cited by examiner

Primary Examiner—Clifford C. Shaw
(74) Attorney, Agent, or Firm—Darby & Darby

(57) ABSTRACT

The heat of arc plasma generated in arc welding is used to provide a welding method for a Si-based material. The method of the present invention is capable of welding a Si-based material, which is difficult to weld by conventional methods due to its brittle nature and high electric resistance. In an argon gas atmosphere, a tungsten electrode is used as a cathode. A water cooling copper sheet and plate is used as an anode. An arc is generated between this pair of electrodes. The arc length is gradually extended, and a pair of Si-based materials are near an arc column. Fusion welding of a weld zone is carried out while rotating the Si-based materials around an axis.

8 Claims, 5 Drawing Sheets

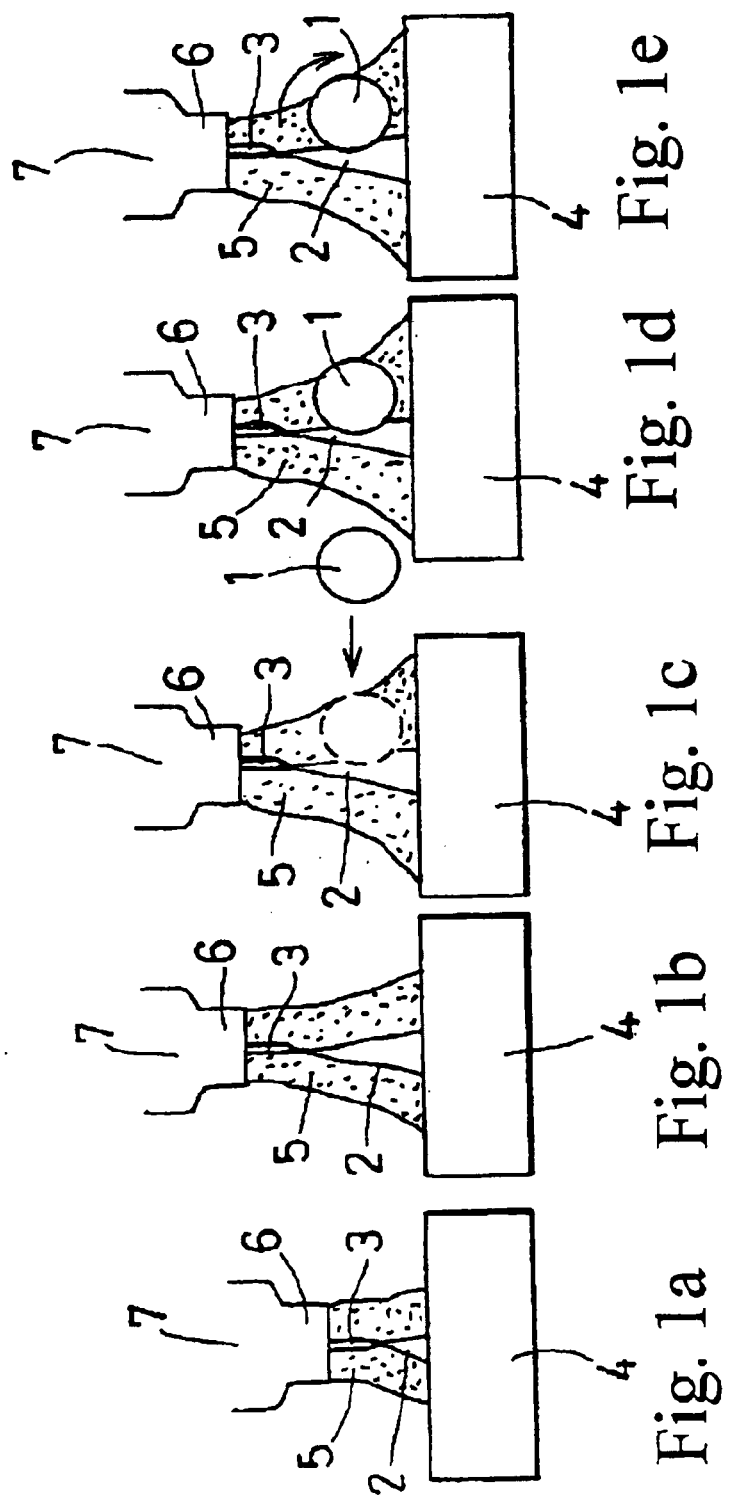

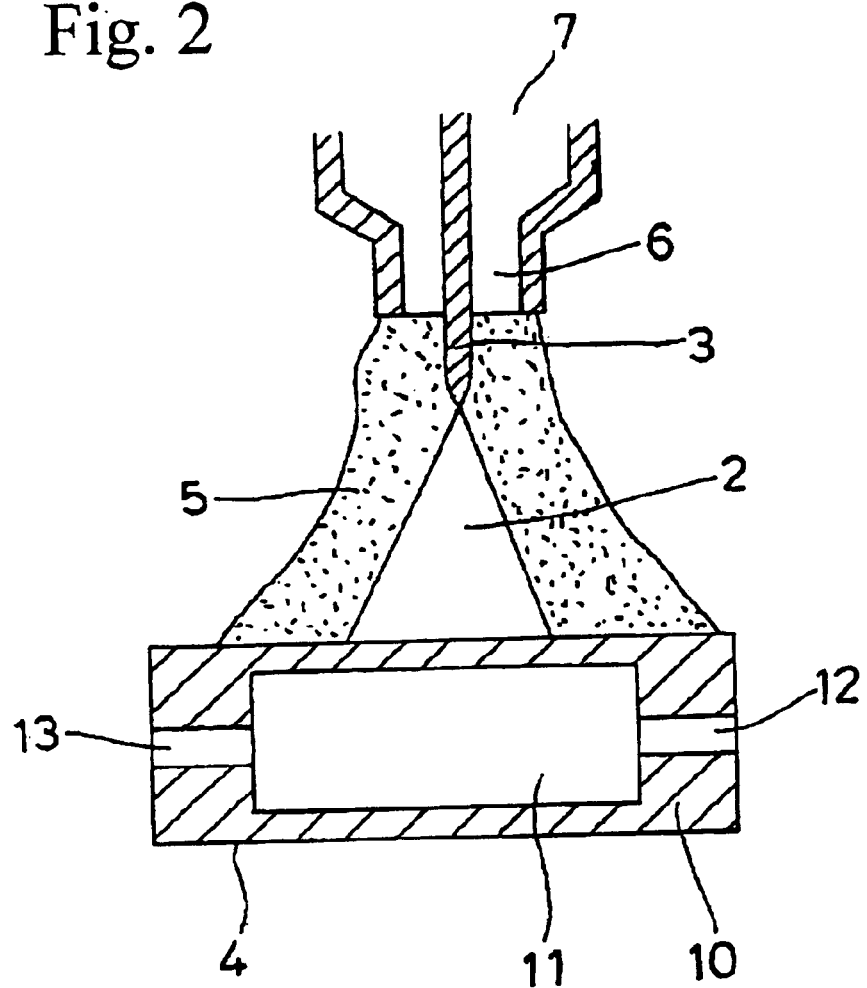

WELDING METHOD OF AN SI-BASED MATERIAL

BACKGROUND OF THE INVENTION

The present invention relates to a welding method of a Si-based material. More specifically, the present invention relates to a welding method of a Si-based material which melts (fuses) and welds a Si-based material containing a single crystal or polycrystal silicon (hereinafter, referred to simply as Si) by arc welding.

In recent years, Si-based material has shown a remarkable progress in demand for a semiconductor material, and its physical and electrical characteristics as a semiconductor has attracted special interests. In the Si-based material, a Si useful as a bulk material is growing in great demand for use in silicon wafers. Recently, these wafers have been made a large diameter, and a Si ingot, which is the source of the wafer, has come to 200 kg or more in its weight. For this reason, in a manufacturing process of the Si ingot, there is a large problem how the Si ingot should be held and carried. More specifically, in an industry detesting a pollution of metal, Si or the like is used in a handling jig or the like. However, the ingot is increased in its weight, and is made a large diameter. For this reason, it is difficult to manufacture the aforesaid jig.

Therefore, an idea has been proposed such that the Si ingot itself is subjected to machining to make the Si ingot easier to carry. However, it is difficult to subject the Si ingot to machining, and after-cleaning or the like is required; for this reason, there arises a new problems such as an increase in cost and a more complicated manufacturing process.

On the other hand, in a wafer welding technique, as disclosed in Japanese Patent Application No. 3-107853, there is an SOI wafer, such as an aligned wafer. However, a welding technique is employed in order to improve an electrical characteristic, and therefore, the purpose is different from the present invention which improves a structural characteristic.

The Si-based material is very brittle. For this reason, when a great heat is applied, the Si-based material is impactively fractured. Thus, it is considered that it is difficult to carry out fusion welding with respect to the Si-based material. Recently, by using a high energy density heat source, that is, an electron beam or laser beam, it is possible to weld the Si-based material (see Japanese Patent Application No. 9-365188). However, in the aforesaid method, the welding equipment is very expensive, and, in addition, there is a limitation such that a weldment must be treated in a vacuum chamber.

In view of the above circumstances, arc welding has attracted specific interest because it requires no vacuum chamber and is relatively cheap in its equipment. However, Si, which is a semiconductor material, has an electric resistance of 1000 ohm-cm or more at a room temperature. For this reason, in welding using arc discharge as a heat source, the Si material shows a behavior similar to an insulating material. As a result, it has been considered that fusion welding using the discharge as an indispensable arc is impossible. This is because, in general, a high resistance material such as Si does not function as an electrode for arc discharge. Therefore, it is impossible to realize fusion by directly discharging the Si-based material.

OBJECTS AND SUMMARY OF THE INVENTION

It is an object of the present invention to provide a method for welding a Si-based material which overcomes the foregoing problems.

It is another object of the present invention to provide a welding method for an Si-based material comprising the steps of generating an arc between a pair of electrodes; bringing the Si-based material near to an arc column; and performing welding by melting the Si-based material using a heat of arc plasma.

Briefly stated, the present invention provides heat of arc plasma generated in arc welding that is used to provide a welding method for a Si-based material. The method of the present invention is capable of welding a Si-based material, which is difficult to weld by conventional methods due to its brittle nature and high electric resistance. In an argon gas atmosphere, a tungsten electrode is used as a cathode. A water cooling copper sheet and plate is used as an anode. An arc is generated between this pair of electrodes. The arc length is gradually extended, and a pair of Si-based materials are near an arc column. Fusion welding of a weld zone is carried out while rotating the Si-based materials around an axis.

According to an embodiment of the present invention, there is provided a welding method for a Si-based material, comprising: generating an arc between a first second electrodes; bringing the Si-based material close to an arc column; and performing welding by melting the Si-based material using heat of arc plasma.

According to the present invention, in arc welding an arc (column) is generated between electrodes other than the Si-based material. Thereafter, the Si-based material is brought near to the above arc column. Next, the Si-based material is melted by a heat of arc plasma. In other words, according to the present invention, arc welding is applied to the Si-based material which has been considered as being impossible to weld because it is very brittle and has a high electric resistance. Therefore, it is possible to carry out machining by welding with respect to a member made of the Si-based material which has been conventionally manufactured only by subjecting it to machining. Furthermore, a shape member incapable of being manufactured by machining is made possible to be manufactured, and therefore, it is possible to greatly improve a degree of freedom in machining the Si-based material.

According to the welding method of an Si-based material defined in the first aspect, an arc discharge is generated between electrodes other than the Si-based material which is a weldment. Next, the Si-based material is brought near to an arc column of the generated arc, is heated, and melted using a heat of arc plasma. The method of the present invention makes it possible to perform fusion welding with respect to the Si-based material which does not function as an electrode and is incapable of being welded. Moreover, a distance between the center of discharge and the Si-based material is controlled in a manner that the Si-based material is brought near to the arc column or is separated therefrom. Therefore, it is possible to start a fusion while relieving a heat impact to the Si-based material, gradually performing fusion welding.

Further, according to a second aspect, the present invention provides a welding method for a Si-based material, wherein a water cooling copper sheet and plate is used as an anode side electrode of the electrodes.

According to the welding method of Si-based materials defined in the second aspect, a copper plate having a high heat conductivity is used as an anode side electrode. A cooling water passage supplys a cooling water in the copper plate. This method prevents the anode from being melted by an arc heat. As a result, it is possible to suppress a generation of metal vapor from the water cooling copper sheet and plate, and to perform fusion welding without contamination.

Further, according to a third aspect, the present invention provides the welding method for a Si-based material, wherein a means is provided for improving a directionality of the arc.

According to the welding method of Si-based materials defined in the third aspect, there is provided a means for improving a directionality of arc. This method stabilizes a heat input amount introduced to the Si-based material and a fusion amount, and improves a reproducibility of fusion.

Further, according to a fourth aspect, the present invention provides a welding method for a Si-based material, wherein after arc start, an arc length is gradually extended. Thereafter, the Si-based material is brought near the arc column.

A distance between arc discharge electrode is not so wide, and it is possible to weld the Si-based material having a distance between electrodes larger than the above distance. However, according to the welding method of Si-based materials defined in the fourth aspect, first, an arc start is carried out in a shorter distance between electrodes. Thereafter, an arc length is gradually extended using a continuous discharge of arc. It is possible to weld a Si-based material having a distance larger than the distance between electrodes in the arc start. Moreover, the initial distance between electrodes is set shorter, and then, arc start is carried out at a low current. Thereby, it is possible to prevent a damage to both electrodes. In addition, according to the welding method, in the arc start time when a metal vapor is remarkably generated, the Si-based material is far way from the arc column. Then, after the arc length is extended, the Si-based material is brought near to the arc column so as to be melted; therefore, it is possible to perform fusion welding without contamination.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 1(a)–1(e) are schematic views explaining a welding procedure of an embodiment according to the present invention.

FIG. 2 is a cross sectional view showing a tungsten electrode (rod) and its surroundings and a water cooling copper sheet and plate according to the present invention.

DETAILED DESCRIPTION OF THE INVENTION

Figure 3A:
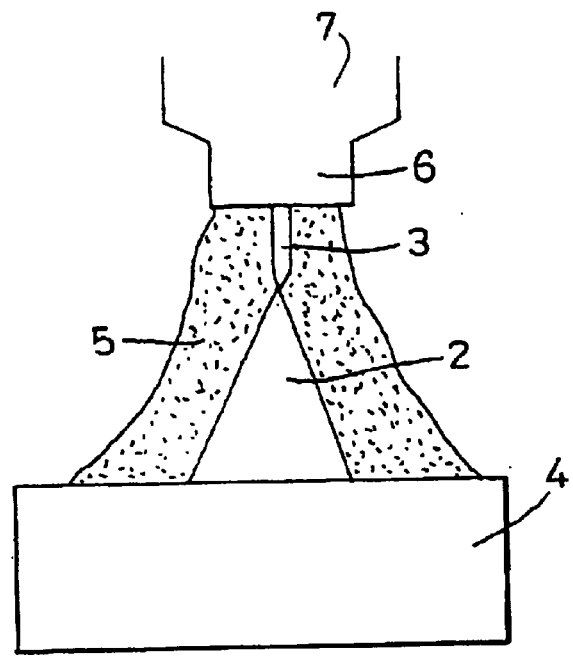
FIG. 3(a) shows a state when an arc discharge is started.

In one embodiment of the present invention, non-consumable arc welding, that is, TIG arc welding, is employed so as to carry out butt welding of a pair of Si members.

Referring to FIG. 1, an argon gas 5 is supplied from a nozzle 6 of a torch 7. Then, in the argon gas 5 atmosphere, a tungsten electrode (rod) 3 is used as a cathode, and further, a cylindrical water cooling copper sheet and a plate 4 is used as an anode. Thus, an arc is generated between electrode 3 and plate 4. In this case, a distance between both electrode 3 and plate 4 is 3 mm, and the initial current value is 75 A. In the water cooling copper sheet and plate 4, a cooling water passage 11 is provided in a copper plate 10 having a high heat conductivity. More specifically, as shown in FIG. 2, the water cooling copper sheet and plate 4 are constructed in a manner that it is provided with a pipe which extends from its one end to the other end through the interior thereof. A cooling water is supplied from one end, that is, a inlet side 12, and further, is discharged from the other end, that is, an outlet side 13. This prevents the water cooling copper sheet and plate 4 from being melted by an arc heat by always continuing to supply a cooling water to the water cooling copper sheet and plate 4 during arc discharge. As a result, it is possible to suppress a generation of metal vapor from the water cooling copper sheet and plate 4, and to perform fusion welding without contamination.

Next, in a state that the current value is maintained at 75 A, the distance between electrode 3 and plate 4, that is, an arc length, is gradually extended from 3 mm to 15 mm (see FIG. 1(b)). On the other hand, a pair of polycrystal Si members 1 and 1, having a diameter 6 mm, are butted against each other in their end faces at a position separated from the arc column 2. Then, a longitudinal direction of the Si members 1 and 1 thus butted is directed to a direction substantially perpendicular to the arc. In this state, the Si members 1 and 1 are brought near toward the arc column 2 from the transverse direction (see FIG. 1(c)). Next, a weld zone of the Si member 1 and 1 is sufficiently brought near to the arc column 2. Thereafter, in this state, the Si members 1 and 1 are stopped, and then, for about 10 seconds, a local portion of the weld zone is heated and melted by arc plasma (see FIG. 1(d)). Thereafter, as shown in FIG. 1(e), only Si members 1 and 1 are rotated around the axis at a rotational speed of 9.6 rpm (rotation/minute), and thereby, fusion welding is performed by a heat of the aforesaid arc plasma.

Further, Si members 1 and 1 are separated from the previous fusion position with a distance of about 3 mm. Then, in this state, Si members 1 and 1 continue to be rotated for about 15 seconds. Thereby preventing the weld zone from being rapidly cooled, and a molten pool is gradually made small. In this manner, it is possible to perform a crater treatment.

As described above, the arc discharge is generated between tungsten electrode 3 and the water cooling copper sheet and plate 4, and then, Si members 1 and 1 are brought near to arc column 2 of the generated arc, and further, are heated and melted by taking advantage of a heat of arc plasma. Whereby it is possible to carry out fusion welding with respect to Si members 1 and 1 which do not function as an electrode and are incapable of being welded. Further, Si members 1 and 1 are brought near to arc column 2 or are slightly separated therefrom so as to control a distance between the center of discharge and the Si member. Therefore, it is possible to start a fusion while relieving a heat impact to the Si members 1 and 1, and to gradually perform fusion welding. Furthermore, a distance between electrodes capable of discharging an arc is short, that is, about 5 mm, and it is physically impossible to weld Si members 1 and 1 having a diameter of about 2 mm or more. However, arc start is carried out in a distance between electrodes shorter than 5 mm, and thereafter, an arc length is gradually extended using a continuous discharge of arc. Therefore, it is possible to weld Si members 1 and 1 having a diameter of 2 mm or more.

Moreover, in the above embodiment, the current value is maintained at 75 A. In order to prevent a damage of electrode 3 and plate 4 and to perform welding without contamination, preferably, fusion welding is carried out by a heat of arc plasma with respect to Si members 1 and 1 in the following manner. The initial current value is set to 50 A or less, and an arc start is carried out, and thereafter, the current value is increased after the arc length is extended.

Figure 3B:
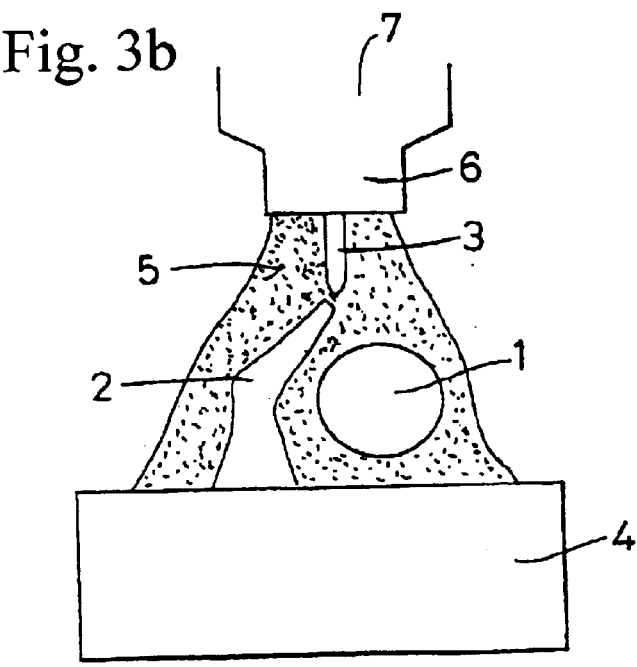
FIG. 3(b) shows a state when an Si member is brought near to an arc column.

By the way, in the case where welding is carried out in the manner described in the above embodiment, as shown in FIG. 3(*a*), before Si members 1 and 1 are brought near to the arc, the arc is radially generated toward a direction from tungsten electrode 3 to the water cooling copper sheet and plate 4 so that its arc length becomes shortest. As shown in FIG. 3(*b*), when Si members 1 and 1 are brought near to arc column 2, the arc is separated from Si members 1 and 1 so as not to be cooled by Si members 1 and 1, and thus, is deflected. This is a factor of making unstable a heat input amount introduced to Si members 1 and 1 and its fusion (molten) amount, and further, deteriorating a reproducibility of the fusion amount.

Figure 4:
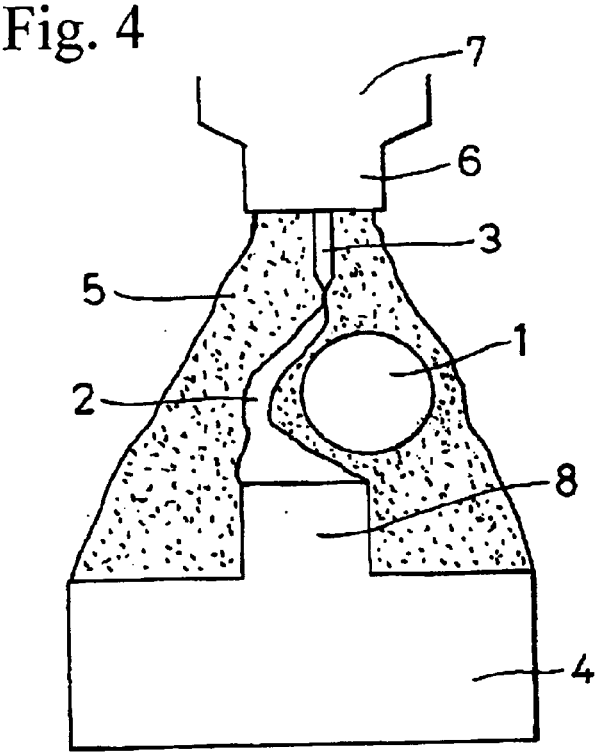
FIG. 4 is a view schematically showing an arc state in the case where a water cooling copper sheet and plate on an anode side is provided with a projected portion.
Figure 5:
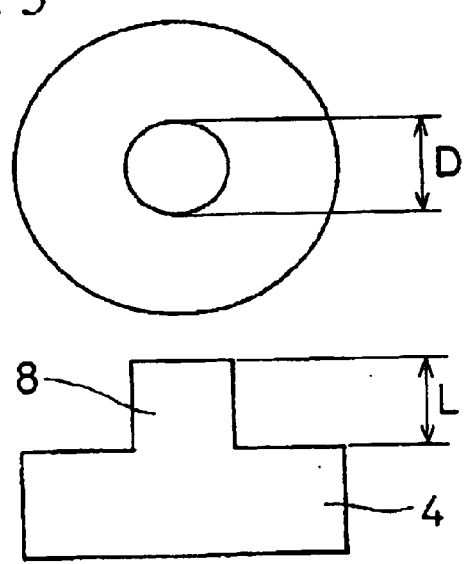
FIG. 5 is a view showing the water cooling copper sheet and plate which is provided with a projected portion.

In order to solve the above problem, there is the need of providing a means for improving an arc directionally. According to an experiment, in a welding arc, it is apparent that a passing area of arc current has a range of diameter 6 to 7 mm. In order to limit a dischargeable area, the water cooling copper sheet and plate 4 is provided (as shown in FIGS. 4 and 5) with a projected portion 8 having a diameter D of 7 mm and a height L of 15 mm, at the central portion on its surface. Thus, in the case where Si members 1 and 1 are brought near to arc column 2, the arc is generated on the projected portion 8; therefore, a deflection becomes small. As a result, the arc column does not converge from the projected portion 8, and is possible to position Si members 1 and 1 to an effective current passage.

Figure 6:
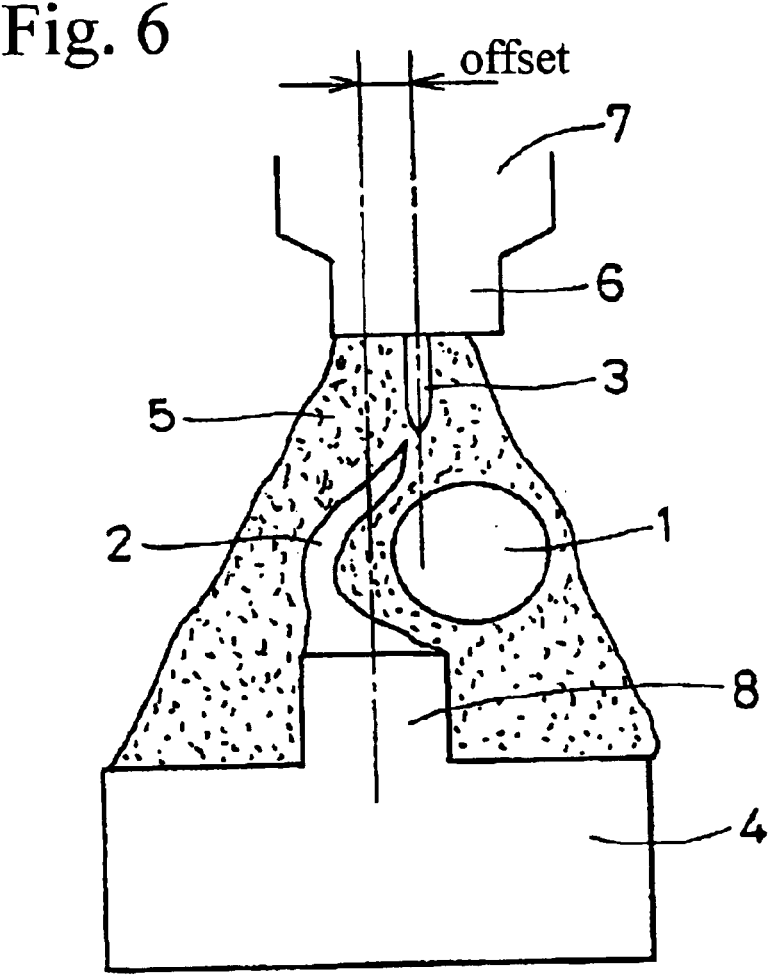
FIG. 6 is a view schematically showing an arc state when carrying out arc welding in a state that the water cooling copper sheet and plate is previously offset from the central position of a cathode.

Moreover, as shown in FIG. 6, when Si members 1 and 1 are brought near to arc column 2, the central position of the water cooling copper sheet and plate 4 is previously offset from the central position of tungsten electrode 3 by a deflection of the arc. Therefore, it is possible to further improve a directionality of arc as compared with the above embodiment. As a result, it is possible to stabilize a heat input amount introduced to Si members 1 and 1 and a fusion amount, and to improve a reproducibility of fusion.

The above has described the embodiment of the welding method of Si-based material according to the present invention. The present invention is not limited to the above embodiment, and various modifications may be possible. More specifically, in the above embodiment, the water cooling copper sheet and plate 4 has been provided with the projected portion 8 as a means for improving the arc directionality. By acting a magnetic field to the vicinity of the arc column 2, the arc directionality may be improved, or by supplying a large current every a predetermined time, that is, every pulse, the arc directionality may be improved. Moreover, an atmosphere gas is changed from the argon gas 5 to a helium gas which is lighter than the argon gas 5 and is easy to be diffused, and thereby, the surroundings of the arc column 2 is cooled, and then, the arc spread range is restricted. As a result, the arc directionality can be improved. In addition, in the above embodiment, welding has been carried out using TIG arc welding as non-consumable arc welding. Other arc welding such as plasma welding or the like may be employed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for welding a Si-based material containing a single crystal or a polycrystal silicon, comprising:

generating an arc between first and second electrodes;

bringing said Si-based material proximal to an arc column; and performing welding by melting said Si-based material using heat of an arc plasma.

2. The method for welding a Si-based material according to claim 1, wherein a water cooling plate is used as an anode side electrode of said first and second electrodes.

3. The method for welding a Si-based material according to claim 2, further comprising:

providing means for improving a directionality of said arc.

4. The method for welding a Si-based material according to claim 1, wherein a tungsten electrode is used as a cathode side electrode of said first and second electrodes.

5. The method for welding a Si-based material according to claim 4, further comprising:

providing means for improving a directionality of said arc.

6. The method for welding a Si-based material according to claim 1, further comprising:

providing means for improving a directionality of said arc.

7. The method for welding a Si-based material according to claim 6, wherein said arc directionality means includes a raised portion on a central surface portion of one of said first and second electrodes and projecting toward a other of said first and second electrodes.

8. The method for welding a Si-based material according to claim 1, wherein:

following said generating step, a length of said arc is gradually extended prior to bringing said Si-based material proximal said arc column.

* * * * *